United States Patent [19]

Devanbu

[11] Patent Number: 5,909,577
[45] Date of Patent: Jun. 1, 1999

[54] DETERMINING DYNAMIC PROPERTIES OF PROGRAMS

[75] Inventor: Premkumar Thomas Devanbu, North Plainfield, N.J.

[73] Assignee: Lucent Technologies Inc., Murray Hill, N.J.

[21] Appl. No.: 08/502,246

[22] Filed: Jul. 13, 1995

Related U.S. Application Data

[63] Continuation-in-part of application No. 08/229,043, Apr. 18, 1994, abandoned.

[51] Int. Cl.[6] ........................................... G06F 9/44
[52] U.S. Cl. ........................... 395/704; 395/183.11
[58] Field of Search ..................... 395/700, 704, 395/183.11, 183.14

[56] References Cited

U.S. PATENT DOCUMENTS

| 4,819,234 | 4/1989 | Huber ........................................... 371/19 |
| 4,853,851 | 8/1989 | Horsch ......................................... 364/300 |
| 5,038,348 | 8/1991 | Yoda et al. ................................... 371/19 |
| 5,313,616 | 5/1994 | Cline ............................................ 395/500 |

FOREIGN PATENT DOCUMENTS

0678810 A1   4/1995   European Pat. Off. ......... G06F 11/00

OTHER PUBLICATIONS

European Search Report dated Dec. 11, 1996.
P.T. Devanbu, "A Customizable, Language–and Front–End Independent Code Analyzer," International Conference on Software Engineering, Melbourne, Aus., 307–317 (May 11–15, 1992).
A. Srivastava and A. Eustace, "Atom. A System for Building Customized Program Analysis Tools," *ACM SIGPLAN Notices*, vol. 29, No. 6, 196–205, (Jun. 1994).
L.M. Russo, "Universal Source Level DeBuggers," *Electro Conference Record*, vol. 15, 62–63 (May 9, 1990).
J.P. Ambras et al., "MicroScope: An Integrated Program Analysis Toolset," *Hewlett–Packard Journal*, No 4, 71–82 (Aug. 1, 1988).

*Primary Examiner*—Kevin A. Kriess
*Assistant Examiner*—Kakali Chaki
*Attorney, Agent, or Firm*—Gordon E. Nelson; Donald P. Dinella

[57] ABSTRACT

Techniques for obtaining information about dynamic properties of a first program. The techniques involve making a static analysis of the first program to determine what instrumentation is needed to produce the desired information and then producing a second program which causes a programmable instrumentation apparatus to produce an instrumented version of the first program. The programmable instrumentation apparatus may be a programmable binary editor or a a debugger. Execution of the instrumented program provides the information about the dynamic properties. The program for the instrumentation apparatus is produced by a source code analyzer which statically analyzes the source code. The source code analyzer is in turn produced by a code analyzer generator. Output from the instrumentation may be provided to a graphical display system. In one use of the techniques, the code analyzer generator not only generates a source code analyzer for producing the second program, but also a source code analyzer for producing a program which when executed by a graphical browser makes a flow graph for the program. In this case, the graphical browser responds to the output from the execution environment by altering the appearance of the flow graph.

20 Claims, 4 Drawing Sheets

FIG. 4

```
1  if (o->xp(y) == T_CONN_P){
2     ......
3     .....
4  } else {
5     ....
6     ....
7     ...           401
8  }
```

```
1  if (o->xp (y) == T_CONN_P) {
1.i    fprintf (log, "True Branch, if at line 1")
2     ......
3     .....
4  } else {
4.i    fprintf (log, "False Branch, if at line 1")
5     ....
6     ....
7     ...           402
8  }
```

FIG. 5

```
1  if (o->xp (y) == T_CONN_P) {
2     ......
3     .....
4  } else {
5     ....
6     ....
7     ...           501
8  }
```

```
break at line 2
commands
print "log" "true branch of if at line 1"
end
break at line 5
commands
print "log" "false branch of if at line 1"
end
                502
```

FIG. 8

```
801  [
802  (?Block
803    (PRINT stdout "break %s \n commands \n delete \n continue" $location))
804  (?Switch
805    <cases
806     |Case
807      (PRINT stdout "break %s \n commands \n delete \n continue" $location)|>)]
```

```
100    . . .
101    if (a == 0) {
102            y=5;
103            printf(stderr,"Test value: 104}
105    else {
106        z=5;
107        printf(stderr,"Test value: 108}
109    . . .
                    1003

200    int instrument (int lno) {
201    record information about execution of this linenumber
202    }
                    1005

301    struct tracecovarray [] ={
302            . . .
303            "x.c", 102,
304            "x.c", 106,
305            . . .
306    }
                    1007

401    . . .
402    for(each binary instruction do) {
403        if (this instruction corresponds to a line number from tracecovarray)
404            insert here a call to instrument
405    }
                    1009
```

DETERMINING DYNAMIC PROPERTIES OF PROGRAMS

RELATED APPLICATIONS

The present application is a continuation-in-part of U.S. Ser. No. 08/229,043, now abandoned, Premkumar Thomas Devanbu, *Determining Dynamic Properties of Programs*, filed Apr. 18, 1994. The present application includes the complete Detailed Description and Figures of the parent application as amended during prosecution of the parent. The new description begins at the section titled *Using the Static Analyzer and a Binary Editing Tool to Instrument Code* and includes new FIGS. 9 and 10.

BACKGROUND OF THE INVENTION

1. Field of the Invention

This invention relates to software testing and verification in general and more particularly to determining dynamic properties of programs.

2. Description of the Prior Art

Introduction

When developing large programs, it is often important to have knowledge about dynamic properties: properties that can be determined only by running the program. Often, the dynamic properties involve information that is not visible during the normal operation of the program. Examples of such dynamic properties with respect to a program P and a set of inputs I for the program are:

1. When run with inputs I, does P execute all its functions?
2. When run with inputs I, does P execute all its IF-statements in both directions?
3. When run with inputs I, does it ever happen that the pointer variable aPerson, which is known be of type struct person * ever point to an object which is not of type struct person?

In order to make the above information and other information like it externally visible, the program needs to be instrumented in some way so that it when the program is executed, it produces output containing the desired information.

The prior art has developed a number of ways of instrumenting a program. One class of these ways adds instrumentation during the process of building the program, that is, the process of compiling the source code to produce object code. One of the ways that belongs to this class is simply adding code for the instrumentation to the source code and then compiling the source code to produce the object code. The object code of course contains code corresponding to the instrumentation code which was added to the source code. Another way is to compile the source code using a special compiler which adds the necessary instrumentation to the object code.

The first technique, adding instrumentation code to the source code, is very general; the kinds of instrumentation which can be added are limited only by the ingenuity of the programmer. The disadvantage, of course, is that adding the instrumentation has meant changing the source code; thus, the source code being investigated is no longer the original source code. The second technique does not require changing the source code, but is considerably less general; only those kinds of instrumentation can be added which are provided by the particular special compiler. Other types of instrumentation require other special compilers or even modification of one of the existing special compilers. Examples of such special compilers are lcc or cc -p, available on computer systems operating under the well-known UNIX operating system (UNIX is a registered trademark of XOPEN).

All of the techniques for instrumenting a program when it is built suffer from the difficulty that the building process can be very complex, and it is often difficult to ensure that the instrumented version of the program built by the build process is functionally equivalent to the version which the build process builds for customers.

Another class of techniques uses tools for instrumenting the object code of a program after the program has been built. An example of such a tools is PURIFY, sold by Pure Software, Inc., 1309 S. Mary Ave., Sunnyvale, Calif., which exploits special patterns of machine code sequences and compiler code generation techniques to identify locations in the binary that are relevant to the property being investigated. The disadvantages of tools like PURIFY are that each tool permits investigation of a small fixed set of properties and that there is no portability, since a version of the tool is required for each different class of processor.

FIG. 1 provides a conceptual overview of systems of the type just described. Under normal circumstances, a system 102 of one or more programs runs with inputs 101 in an execution environment 104. Under these conditions, an internal property such as "does this system execute all functions on inputs 101" cannot be determined. To determine the internal property, we build a transformed version of the system 105, which has been instrumented to generate side effects when something happens during an execution of system 102 which is relevant to the desired property.

For instance, if one wants to find out if system 102 executes all of its functions when executed with inputs 101, one can instrument system 102 by inserting a print statement at the beginning of the source code for each function called by system 102. The instrumentation transforms system 102 into system 105. Now this transformed system 105 is run on inputs 101. Each time transformed system 105 executes a function, it executes the print statement which was inserted at the beginning of the function. The execution of the print statement is a side effect 106, and by looking at the output from the print statements, the programmer can determine which of the print statements were executed and can use that information to determine which functions were executed.

An example of how source code may be modified to determine test coverage for a given set of test inputs is shown in FIG. 4. In this case, the goal is to determine if the test has caused every if-statement to exercise both its true branch and its false branch. The original source code 401 with an if-statement (true and false branches on lines 2 and 5 respectively) is modified by inserting print statements (402) at lines 1.i and 4.i; when this modified code is executed, messages about branch executions are output to a log file and test coverage can be determined by looking at the messages in the log file.

The above techniques all have important drawbacks. Hand instrumentation is completely flexible, and is limited only by the programmer's ingenuity, but is impractical for large programs. Instrumentation tools are practical for large programs, but each tool only provides a limited variety of instrumentation possibilities, and consequently, instrumentation done with these tools is far less flexible than hand instrumentation.

SUMMARY OF THE INVENTION

The techniques of the invention solve the problems of the prior art by using a static analyzer to analyze the source code for a program being instrumented and generate a sequence of instrumentation instructions. The sequence of instrumentation instructions is then consumed by another program which instruments the code as specified in the instrumentation instructions. The instrumented code is then executed to obtain the desired information. The use of the static analyzer permits the flexibility heretofore found only in hand instrumentation and at the same time allows instrumentation of programs of any size.

One species of the above invention is that disclosed in the parent of the present application. In that species, the instrumentation instructions are used to program a programmable execution environment such as a debugger. The unmodified code for the program under investigation is then executed in the programmed execution environment, and the execution environment responds to the execution of the program under investigation by outputting information about the dynamic properties of interest.

In another species, disclosed in the present application, the instrumentation instructions are used to program a binary editing tool, which responds to the program by editing the object code to include object code for the instrumentation. When the edited object code is executed, it outputs the information of interest.

In a third species, the instrumentation instructions may be used to program a programmable text editing tool. The programmable text editing tool then responds to the program by modifying the source code to include code for the instrumentation. When the source code is compiled and executed in the normal manner, the execution outputs the information of interest.

The foregoing and other objects and advantages of the invention will be immediately apparent to those of ordinary skill in the art upon perusal of the following Drawing and Detailed Description.

BRIEF DESCRIPTION OF THE DRAWING

FIG. 4 shows a prior-art technique for instrumenting source code to determine the branch coverage property of a program;

FIG. 5 shows how the technique of the present invention may be employed to modify the execution environment so that it may be used to determine the branch coverage property of a program;

FIG. 8 shows a portion of the GENOA specification used to generate a static analyzer.

Figure 1:
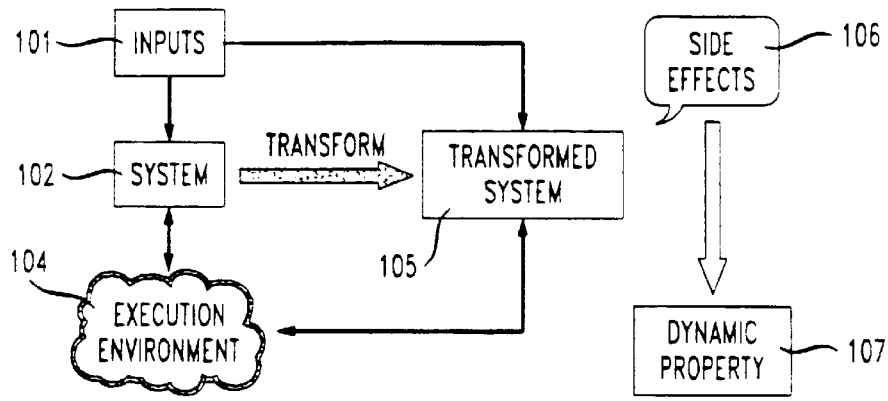
FIG. 1 is a conceptual diagram of prior-art techniques for determining dynamic properties of programs.

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description will first present a general overview of the concept of the invention and will thereupon describe a preferred embodiment using a programmable debugger as the programmable execution environment. The Detailed Description will also disclose how static source code analyzers may be used to produce code for the programmable debugger and how such static source code analyzers may be produced using a system for generating code analyzers. Finally, an embodiment will be disclosed in which the side effects from the programmable debugger drive a graphical display of a flow graph for the program being tested.

Figure 2:
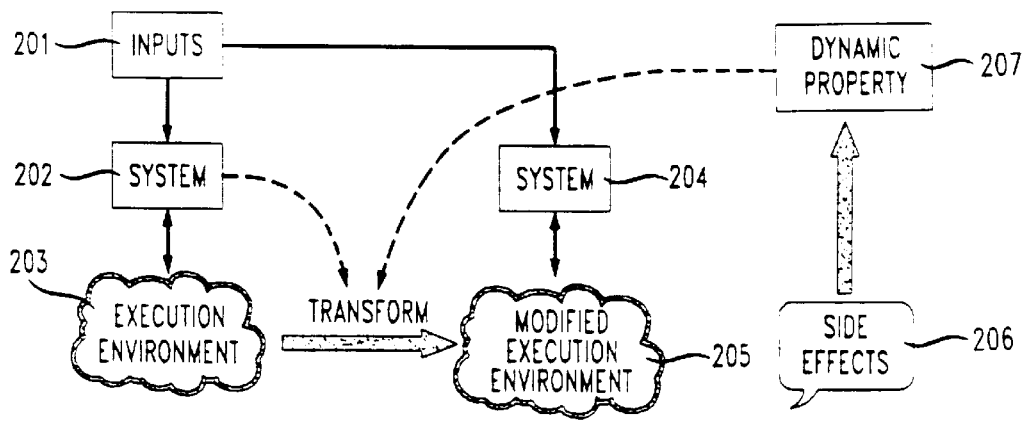
FIG. 2 is a conceptual diagram of the techniques of the present invention for determining dynamic properties of programs.

Overview of the Invention: FIG. 2

The techniques employed in the invention to investigate dynamic properties of programs are shown in overview in FIG. 2. System 202 is made up of one or more programs which are executed in a programmable execution environment 203. One example of such an execution environment is a programmable debugger. We are interested in some dynamic property 207 which system 202 exhibits when executed with inputs 201. Instead of transforming the system, as in FIG. 1, we leave system 202 unchanged, so that system 202 is identical with system 204, which is shown separately in FIG. 2 just for convenience, and instead transform execution environment 203 into another execution environment 205. How the transformation is done depends both on the system being analyzed (202≡204) and the dynamic property 207. Transformed execution environment 205 interrupts the execution of the programs of system 204 (≡202) at points that are determined by the property and the system itself, and generates side effects 206. These side effects, like the side effects 106 generated in FIG. 1, can be used to investigate property 207.

Figure 3:
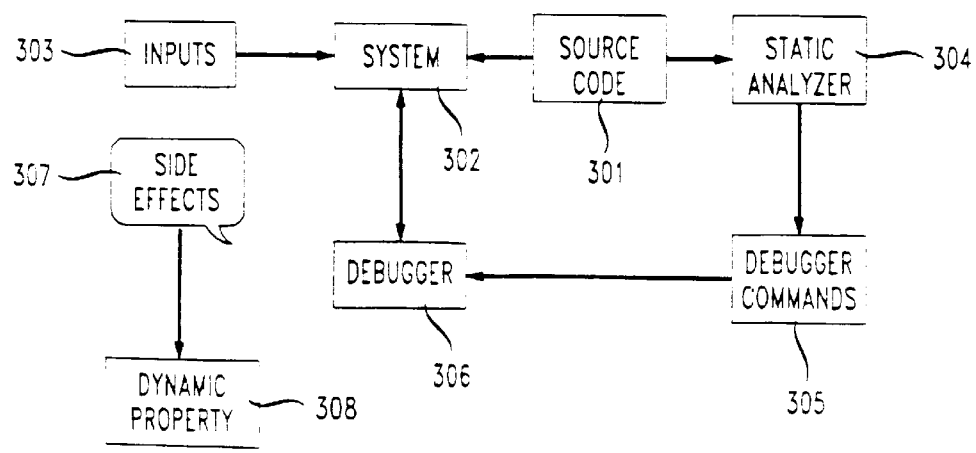
FIG. 3 is a diagram of an embodiment in which the execution environment is a debugger.

Example Embodiment: FIG. 3

FIG. 3 shows an example embodiment of how a dynamic property may be investigated by modifying an execution environment as described in the previous section. In FIG. 3, execution environment 203 is a debugger 306. Debuggers are tools used by programmers for finding bugs in programs. When a program is being debugged, it is executed in the debugger. The debugger permits the programmer to precisely control the execution of the program. A fundamental capability of debuggers is setting breakpoints. A breakpoint is a location in the program at which control passes from the program to the debugger when the program is executed in the debugger. Many debuggers are programmable, that is, the programmer can provide the debugger with a list of instructions which specify not only the locations of the breakpoints, but also actions which the debugger is to take when it encounters the breakpoint. Actions may include halting execution until the person using the debugger restarts it or printing out the contents of machine registers and/or memory locations.

Debuggers of the type used in the present invention work with the executable binaries for a program. The programmer using the debugger specifies a location for a breakpoint relative to the source code for the program. The debugger then finds the corresponding location in the executable binary code and replaces the instruction at that point in the executable binary with an illegal instruction. The debugger retains the replaced instruction and the action which the debugger is to take at the breakpoint.

When the program is executed and the point at which the breakpoint was set is reached, the hardware responds to the illegal instruction with an illegal instruction event. The debugger responds to the illegal instruction event by executing the action which the programmer specified for the breakpoint. When that has been done, the debugger replaces the illegal instruction with the retained actual instruction, executes that instruction, and passes control back to the program, which continues executing until it reaches the next breakpoint.

In the example implementation of the invention, such a debugger 306 is used to determine a specific property 308 of system 302 when run with inputs 303. First, a static analyzer 304 is created for the specific property. Static analyzer 304 is applied to source code 301 for the system and generates a sequence of commands 305 for the debugger 306. Now, the system 302 can be loaded into the debugger 306; the debugger then configures itself by executing commands 305 generated by static analyzer 304 and finally executes system 302 using inputs 303. As configured by generated commands 305, debugger 306 interrupts the execution of system 302 at specified points and creates side effects 307 (for example, writing information about the state of the program at the time of the interruption of execution into a log file). The side effects can then be analyzed for information about dynamic property 307.

A specific example of this approach in use is shown in FIG. 5. Here the application is software testing; it is desired to determine whether a set of tests is complete, that is, whether the tests have executed both the true and false branches of every if-statement. For example, in source code 501, there is an if-statement on line 1, with true- and false-branches beginning at lines 2 and 5 respectively, and the tests must execute both branches. In the preferred embodiment, static analyzer 304 is made using GENOA, a tool for generating source code analyzers. GENOA is described in Devanbu P., GENOA- A language and front-end independent source code analyzer generator, *Proceedings, Twelfth International Conference on Software Engineering*, May 1992. Static analyzer 304 produced by GENOA 710 works on a parse tree representation of source code 501 for the program.

Figure 6:
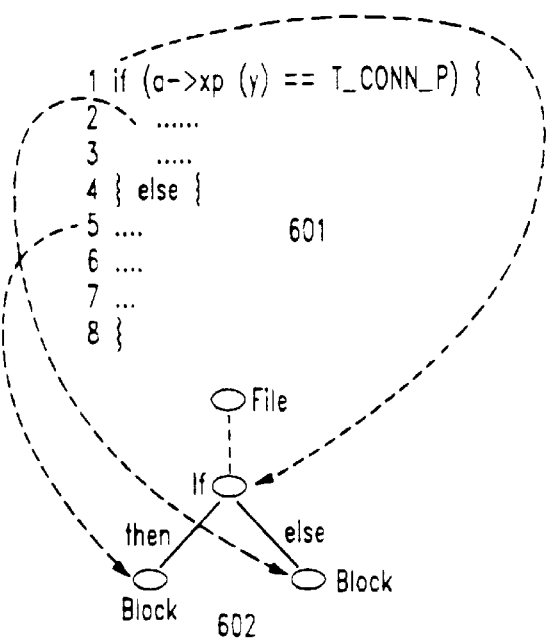
FIG. 6 shows how a static analysis of the program's parse tree is employed to generate code for the modification of the execution environment.

A parse tree is a set of labelled nodes with labelled edges connecting them. The nodes represent different parts of the parse tree. The labels on the nodes represent the type of syntactic structure represented by the node. The entire source file containing the program being analyzed is represented by the node labelled File. Somewhere below this node in the tree is the node labelled If corresponding to the If-statement 601. This portion of the parse tree appears at reference number 602 in FIG. 6. There are two edges going out of this node, labelled then and else (shown in typewriter font) which correspond to the then-and else-parts of the If-statement 601. Each of these edges connect the If node (line 1 in 601) to Block nodes representing the blocks beginning at lines 2 and 5 in 601.

Static analyzer 304 produced by GENOA 710 traverses the parse tree looking for nodes representing If-statements. When the analyzer finds a node for an If-statement, it determines from the parse tree what the starting locations in the source code are for the true- and false- branches, and generates debugger commands 502 (FIG. 5) specifying those locations and actions to be taken when they are reached. When the commands are provided to debugger 306 and the system 302 built from the source code 501 is executed by the debugger as configured by the commands, the debugger performs the action specified for the breakpoint at each breakpoint reached by the execution. If the actions specified for all of the breakpoints have taken place, the set of tests is complete with regard to the branches of the if statements. It should be noted here that the debugger instructions need not be produced from source code 501, but can be produced as well from any available source of information about the program being tested.

Figure 7:
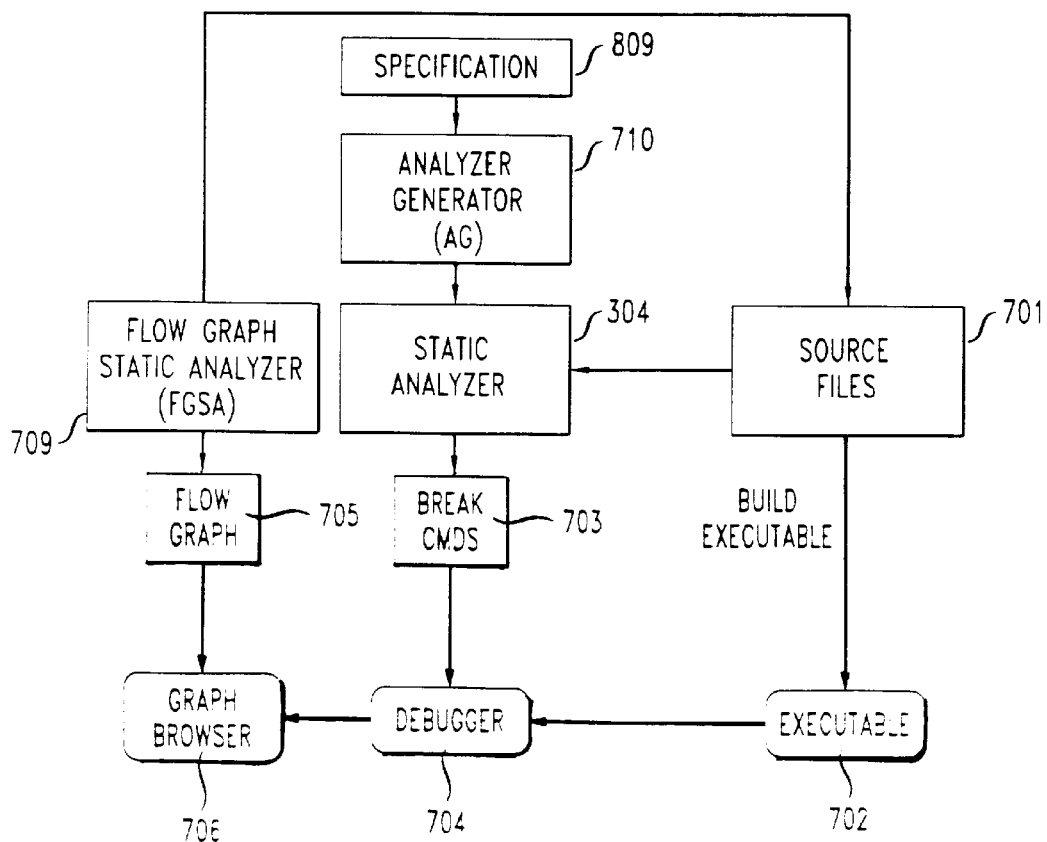
FIG. 7 shows how output from the execution environment may be applied to a graph browsing program to produce a dynamic graphical representation of the results of a test of a program.

As is apparent from the foregoing discussion, the technique requires no modification of the source code. The modifications of the executable binary produced by the debugger are temporary and do not involve the addition of instructions to the executable binary. When the debugger is one which is available on many platforms, one gains the convenience of binary instrumentation without sacrificing portability. An example of such a debugger is gdb, described in Stallman, R., and Pesch, R., Debugging with GDB, available by Internet file transfer from prep mit.edu).
Coupling the Dynamic Property Analyzer to a Graphical Display: FIG. 7

The side effects 307 produced by debugger 306 may of course be provided to any kind of device which produces output which is useful for analyzing the dynamic property. For example, in FIG. 7, the side effects 307 are used to animate a flow graph 705. Flow graph 705 is produced in this example using another static analyzer 709 made with GENOA. Flow graph 705 is provided to graphical browser 706 for visual display. Then, we analyze the source code to produce commands 703 for a debugger 704 as described above. The commands set breakpoints at beginnings of blocks etc; each time a breakpoint is activated, the debugger responds as specified by the commands. In this case, the commands specify that an inter-process message specifying a modification in the visual display of the flow graph be sent from the process in which debugger 704 is executing to the process in which graphical browser 706 is executing. In response to the message, graphical browser 706 modifies the visual display. This technique can be used for visual display of test coverage information or simply as an aid to program comprehension and debugging.
Using GENOA to make a static analyzer: FIG. 8

A portion of a specification 809 used with GENOA 710 to produce a static analyzer 304 is shown in FIG. 8. The static analyzer which GENOA produces from specification 809 performs a search of the entire program for blocks and switch statements. The search is specified by the square brackets at line 801 and the end of line 807. What is being searched for is specified at line 802 (for the blocks) and line 804 (for the switch statements). Line 803 specifies that breakpoints are to be set at the beginning of the block and that debugger commands are to be generated for each breakpoint which instruct the debugger to delete the breakpoint and continue. For switch statements, breakpoints are set at each case of the switch (line 807) and the same debugger commands are to be generated. Since each breakpoint is deleted when activated, the breakpoints remaining after a test run indicate the parts of the code that have not been executed. The programmable debugger employed in the preferred embodiment indicates to the user which breakpoints have not been executed, and thus indicates which parts of the code have not been executed. For more details on GENOA 710 and the language it uses to specify static code analyzers, see Devanbu P., GENOA- A language and front-end independent source code analyzer generator, *Proceedings, Twelfth International Conference on Software Engineering*, May 1992).

As is apparent from FIG. 8, the use of a static source code analyzer generator such as GENOA 710 greatly simplifies the implementation of static analyzers 304. When a tool such as GENOA is used together with a programmable and portable debugger such as gdb, one can easily implement devices to determine a wide range of dynamic properties on a wide range of hardware.

Figures 9, 10:
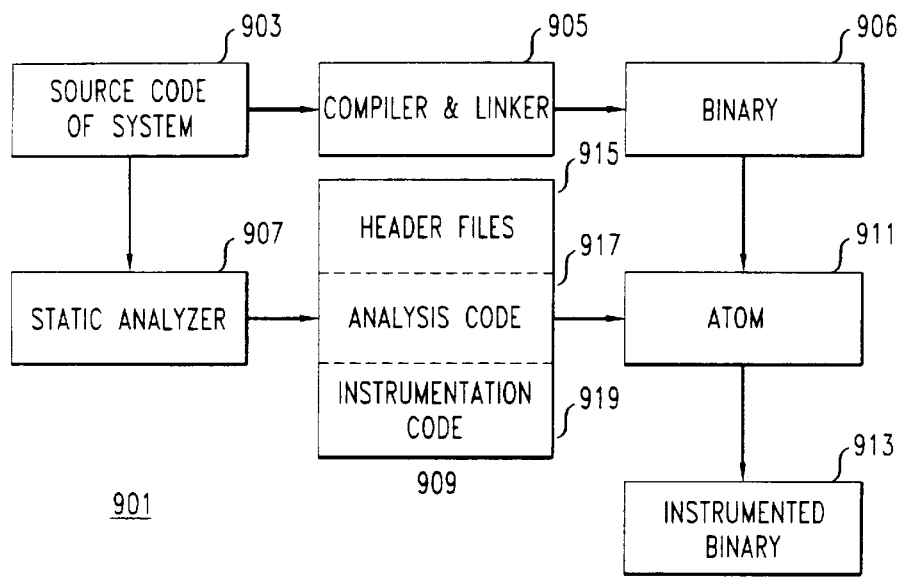
FIG. 9 is a conceptual diagram of how prior static analysis is used in conjunction with a binary instrumentation tool to instrument code.
FIG. 10 is an example of the code and data generated for instrumentation for test coverage.

Using the Static Analyzer and a Binary Editing Tool to Instrument Code: FIGS. 9 and 10

The instrumentation techniques described in the parent of the present application are flexible and portable; however, there is a penalty for using the debugger. When the instrumented code is being executed under the control of the debugger and the execution reaches a point which has been instrumented, the debugger has to be invoked to gather the information specified in the instrumentation and after it has done this, the debugger must return to the target program. This results in two context switches each time a point that has been instrumented is reached, and that in turn may slow down execution of the target program to an undesirable degree.

To avoid the overhead of the context switches, we have developed a technique which uses a programmable binary editing tool instead of a debugger to provide instrumentation. Programmable binary editing tools edit a program's object code and consequently can be used to instrument the object code. Since the instrumentation is contained in the object code, there is no need to switch contexts whenever a point which has been instrumented is reached. Programmable binary editing tools have recently become available for a number of hardware platforms. They provide various primitives for scanning, analyzing, and modifying executables. A typical application of such a tool is to scan through a binary and insert instrumentations at every load and store instruction to check if that load or store results in a cache miss. Such tools can be difficult to use, and highly platform-dependent, but they result in highly efficient dynamically instrumented binaries. One example of such an editing tool is ATOM (See "ATOM: A System for building customizable program analysis tools" by A. Srivastava and A. Eustace in Proceedings of the *ACM SIGPLAN Conference on Programming Language Design and Implementation*, Orlando Fla., 1994).

Our technique for instrumenting a program using a binary editing tool begins as before by statically analyzing the source code to determine the points in the source code where intervention is necessary at run time. However, instead of generating commands for a debugger, we generate commands for binary instrumentation programs. We have used this technique with ATOM to make a branch coverage analysis tool for the ALPHA™ platform.

FIG. 9 shows a preferred embodiment of the above technique. Instrumentation system 901 employs ATOM system 911. ATOM is described in full in *ATOM Reference Manual*, Digital Equipment Corporation, Maynard, Mass., 1993, which is obtainable electronically from ftp://ftp.dec.com/pub/DEC/atomtools. That document is hereby incorporated by reference into this description.

As shown in FIG. 9, to instrument a system using ATOM, one takes source code 903 for the system and compiles and links it in the usual fashion, using compiler and linker 905. The result of this process is the object or binary code files 906 for the system. The next step is to apply ATOM 911 to binary code files 906 to produce instrumented binary code files 913. How ATOM 911 instruments binary code files 906 is determined by files 909. There are three such files: analysis code 917 contains one or more functions in the well-known C language which collect and output data about the execution of the program. Instrumentation code 919 contains functions which specify when the functions specified in analysis code 917 are to be called during execution of the code in instrumented binary files 913. The functions in instrumentation code 919 may in turn determine when an analysis function is to be called from data in header files 915. For example, header files 915 may include a file which lists the line numbers in the source code of the instructions at which a given function in analysis code 917 is to be called and instrumentation code 919 may include a function which specifies that the given function is to be called whenever program execution reaches one of the line numbers specified in the header file 915.

ATOM takes the code and data in files 909 and the binary code files produced by compiler and linker 905 and produces from them instrumented binary files 913. These instrumented files 913 differ from the original binary files 906 in that object code for calls to the functions specified in analysis code 917 has been inserted in instrumented binary files 913 at the locations specified by instrumentation code 919 and, where relevant, header files 915. Moreover, the object code for the functions in analysis code 917 have been linked into instrumented binary 913. Thus, when instrumented binary files 913 are executed, the calls to the functions of analysis code 917 are made as specified in instrumentation code 919 and header files 915 and the data produced by the called functions is output as the instrumented binary files 913 are executed. The data can be simply output to a file or otherwise be used as required by the user. For example, it can be used to drive a graph browser as described with regard to the output of data from debugger 704 of FIG. 7. Moreover, because the analysis functions have been linked into instrumented binary 913, the calls and returns are done without the context changes that slow the execution of instrumented code when the programmable debugger is used.

As can be seen from the foregoing, ATOM is extremely flexible. The only limits on the analysis code are those of the C language, and the header files and instrumentation code together permit instrumentation at the level of the instruction, the block, and the procedure. Use of ATOM with large programs is, however, limited by the fact that the contents of files 909 are produced by hand and by the fact that the programs in these files are large, intricate, and difficult to write. They are, moreover, not specific to the program being instrumented.

These drawbacks can be overcome by using static analyzer 907 to produce part or all of the contents of files 909. Static analyzer 907 is used in this regard in the same fashion as in the system of the parent of the present application except that static analyzer 907 generates part or all of data for header files 915, analysis code 917, or instrumentation code 919 instead of debugger commands. It should be noted in this regard that because the contents of header files 915 control the behavior of instrumented binary 913, there is conceptually no difference between header files 915 and the code of analysis code 917 and instrumentation code 919. As was the case with the parent, static analyzer 907 can be built by hand or may be produced using a generator tool such as GENOA 710.

In the parent, an example was disclosed in which a program was instrumented to permit test coverage analysis. The same thing may be done using ATOM instead of the programmable debugger of the parent. FIG. 10 shows fragments of the contents of files 909 in such an example. At 1003 is shown a fragment of the source code file x.c containing the code which is to be instrumented; in the fragment, an if . . . else statement is shown; since we want to know whether tests of the program cover it completely, we need to instrument the fragment so that there is a first side effect when the statement at line 102 is executed and a second side effect when the statement at line 106 is executed.

The analysis function required in this case is simple; all it need do is output information indicating that the line being instrumented was in fact executed. A fragment of this analysis code is shown at 1005. The instrumentation code 919 is also simple; it need only specify that when a line specified in one of the header files 915 is executed, the analysis function be invoked. A fragment of code 919 is shown at 1009. A fragment of a header file 915, finally, is shown at 1007. As may be seen there, the header file is a list in which each entry contains the name of a source code file (here, x.c) and the number of a line of that source code file which is to be instrumented.

In our example, the code for the analysis function and the instrumentation function is so simple and general that it is written by hand. Static analyzer 907 is used to generate header file 915 indicating which lines of x.c are to be instrumented to make sure that all of the branches are executed. The manner in which static analyzer 907 generates header file 915 is of course exactly the same as the manner in which it generated debugger commands in the parent; the only difference is that the output is in the format required for the header file, rather than in the format required for the debugger commands.

Conclusion

The foregoing Detailed Description has disclosed to those skilled in the art the best mode presently known to the inventor of practicing his techniques for determining dynamic properties of a program. A key aspect of these techniques is the employment of static analysis to generate instructions for a programmable device for program instrumentation. As disclosed herein, the programmable device may be a programmable debugger or a programmable binary editor. However, the technique may be employed with any other such device. For example, the programmable device may be a programmable editor for program source code. The use of static analysis to generate instructions for specifying instrumentation gives the person instrumenting the program the flexibility characteristic of hand-done instrumentation, but permits easy instrumentation of programs of any size. Finally, it is particularly advantageous to use a system such as GENOA to produce the static analyzer, but the analyzer could be produced in any way, including by hand. Having understood the principles of the techniques disclosed herein, those skilled in the art will be able to produce systems which employ the principles of the invention, but differ in every other respect from the embodiments disclosed herein.

That being the case, the Detailed Description is to be understood as being in all respects illustrative and exemplary, but not restrictive, and the scope of the invention is not to be defined by the Detailed Description, but rather by the claims as interpreted with the full breadth permitted by the law.

What is claimed is:

1. An apparatus for determining a dynamic property of a program, comprising:

a static analyzer for generating an instrumentation file from source code of the program;

a compiler for generating a binary code file from the source code of the program; and a binary editing tool which processes the binary code file generated by the compiler using the instrumentation file generated by the static analyzer, to produce an instrumented binary code file which when executed provides information regarding the dynamic property of the program.

2. The apparatus of claim 1 wherein the binary editing tool is a programmable binary editing tool.

3. The apparatus of claim 1 wherein the instrumentation file generated by the static analyzer is part of a set of instrumentation files generated by the static analyzer from the source code of the program, the set of instrumentation files including analysis code, instrumentation code and at least one header file.

4. The apparatus of claim 3 wherein the at least one header file specifies line numbers in the source code at which a given function in the analysis code is to be called.

5. The apparatus of claim 4 wherein the at least one header file comprises a multi-entry list in which each entry includes a name of a source code file and a number of a particular line, of that source code file, which is to be instrumented.

6. The apparatus of claim 3 wherein the analysis code includes at least one function which is operative to collect and output information regarding execution of the source code of the program during execution of the corresponding instrumented binary code file.

7. The apparatus of claim 6 wherein the at least one function of the analysis code includes a function which outputs information indicating whether a particular line of the source code is executed when the corresponding instrumented binary code file is executed.

8. The apparatus of claim 3 wherein the instrumentation code includes at least one function which specifies when a given function in the analysis code is to be called during execution of the instrumented binary code file.

9. The apparatus of claim 8 wherein the instrumentation code utilizes information in the header file to determine when the given function in the analysis code is to be called during execution of the instrumented binary code file.

10. The apparatus of claim 9 wherein the instrumentation code indicates that when a line specified in the header file is executed, the given function of the analysis code is to be called.

11. A method of determining a dynamic property of a program, comprising the steps of:

generating an instrumentation file from source code of the program;

generating a binary code file from the source code of the program; and processing the binary code file in a binary editing tool using the instrumentation file, to produce an instrumented binary code file which when executed provides information regarding the dynamic property of the program.

12. The method of claim 11 wherein the step of processing the binary code file in a binary editing tool includes processing the binary code file in a programmable binary editing tool.

13. The method of claim 11 wherein the instrumentation file is part of a set of instrumentation files, the set of instrumentation files including analysis code, instrumentation code and at least one header file.

14. The method of claim 13 wherein the at least one header file specifies line numbers in the source code at which a given function in the analysis code is to be called.

15. The method of claim 14 wherein the at least one header file comprises a multi-entry list in which each entry includes a name of a source code file and a number of a particular line, of that source code file, which is to be instrumented.

16. The method of claim 13 wherein the analysis code includes at least one function which is operative to collect and output information regarding execution of the source code of the program during execution of the corresponding instrumented binary code file.

17. The method of claim 16 wherein the at least one function of the analysis code includes a function which outputs information indicating whether a particular line of the source code is executed when the corresponding instrumented binary code file is executed.

18. The method of claim 13 wherein the instrumentation code includes at least one function which specifies when a given function in the analysis code is to be called during execution of the instrumented binary code file.

19. The method of claim 18 wherein the instrumentation code utilizes information in the header file to determine when the given function in the analysis code is to be called during execution of the instrumented binary code file.

20. The method of claim 19 wherein the instrumentation code indicates that when a line specified in the header file is executed, the given function of the analysis code is to be called.

* * * * *